(12) United States Patent
Johnson, III

(10) Patent No.: US 11,634,044 B2
(45) Date of Patent: Apr. 25, 2023

(54) CHARGER PLUG RELEASE SYSTEM

(71) Applicant: Herbert L. Johnson, III, Roy, WA (US)

(72) Inventor: Herbert L. Johnson, III, Roy, WA (US)

( * ) Notice: Subject to any disclaimer, the term of this patent is extended or adjusted under 35 U.S.C. 154(b) by 0 days.

(21) Appl. No.: 17/895,442

(22) Filed: Aug. 25, 2022

(65) Prior Publication Data
US 2023/0064275 A1 Mar. 2, 2023

Related U.S. Application Data

(60) Provisional application No. 63/236,755, filed on Aug. 25, 2021.

(51) Int. Cl.
*B60L 53/16* (2019.01)

(52) U.S. Cl.
CPC .................................... *B60L 53/16* (2019.02)

(58) Field of Classification Search
CPC ...................................................... B60L 53/16
USPC ...................................................... 320/109
See application file for complete search history.

(56) References Cited

U.S. PATENT DOCUMENTS

| | | |
|---|---|---|
| 3,784,958 A | 1/1974 | Harris |
| 4,176,899 A | 12/1979 | Betts |
| 5,266,040 A | 11/1993 | Merrill et al. |
| 9,365,116 B2 | 6/2016 | Staley et al. |
| 2002/0064983 A1 | 5/2002 | Patey |
| 2014/0021915 A1* | 1/2014 | Staley ........................ H02J 7/00 439/153 |
| 2018/0201145 A1* | 7/2018 | Yellambalase .......... B60L 53/60 |
| 2019/0260146 A1* | 8/2019 | Feldner ................ H01R 12/714 |
| 2020/0079235 A1* | 3/2020 | Moseke .................. B60L 50/60 |
| 2021/0006010 A1* | 1/2021 | Schreiber ................ B60L 53/16 |
| 2021/0344136 A1* | 11/2021 | Kanamori ............ H01R 13/506 |

OTHER PUBLICATIONS

"Self-Eject System: Safe automatic vehicle inlet", antares.co.uk, http://www.antares.co.uk/self-eject-ac-inlet.html [Date accessed: May 22, 2022].

* cited by examiner

*Primary Examiner* — Nathaniel R Pelton
(74) *Attorney, Agent, or Firm* — Bold IP, PLLC

(57) ABSTRACT

A charger plug release system for use with an electric vehicle is provided. The charger plug release system provides a preloaded outward force to the electric charging plug when the plug is electrically connected to a charging receptacle on the EV. When charging is completed, the plug may be released (e.g., via a mobile "app"), and the outward force applied by the system to the plug causes the plug to be ejected without manual intervention. Accordingly, the release system eliminates the need for the user to manually pull the plug from the EV charging receptacle, and instead, forcefully ejects the plug from the EV automatically. This allows the user to automatically remove the plug from the EV from within the vehicle or from another safe location.

20 Claims, 10 Drawing Sheets

CHARGER PLUG RELEASE SYSTEM

CROSS-REFERENCE TO RELATED APPLICATIONS

This application claims priority to U.S. Provisional Application No. 63/236,755 filed Aug. 25, 2021, the entire contents of which are hereby fully incorporated herein by reference for all purposes.

FIELD OF THE INVENTION

This invention relates to electrical charging systems, including charging plug release systems.

BACKGROUND

Electric vehicles (EVs) are becoming popular throughout the world. The EVs require periodic electrical charging to operate, and accordingly, personal charging stations are available for at-home use, and public charging stations are typically available throughout communities for public use.

Each EV includes a charging receptacle into which a charging plug (from a charging station) may be inserted to provide the electrical charging power. When the plug is engaged with the receptacle, the plug is locked in place and upon completing the charging process, the plug must be unlocked, and physically removed.

In addition, many EVs may not be placed into gear and driven if the charging plug has not been fully removed from the EV's charging receptacle. While this may be adequate in most scenarios, it requires the user to exit the vehicle and manually remove the plug from the EV in order to leave the charging station. However, if the user feels unsafe to be outside the vehicle and the plug cannot be physically removed, the user is essentially trapped inside the EV.

Accordingly, there is a need for a system for automatically removing a charging plug from an EV charging receptacle without human intervention. The presently disclosed assembly addresses these needs.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

SUMMARY

Figure 1:
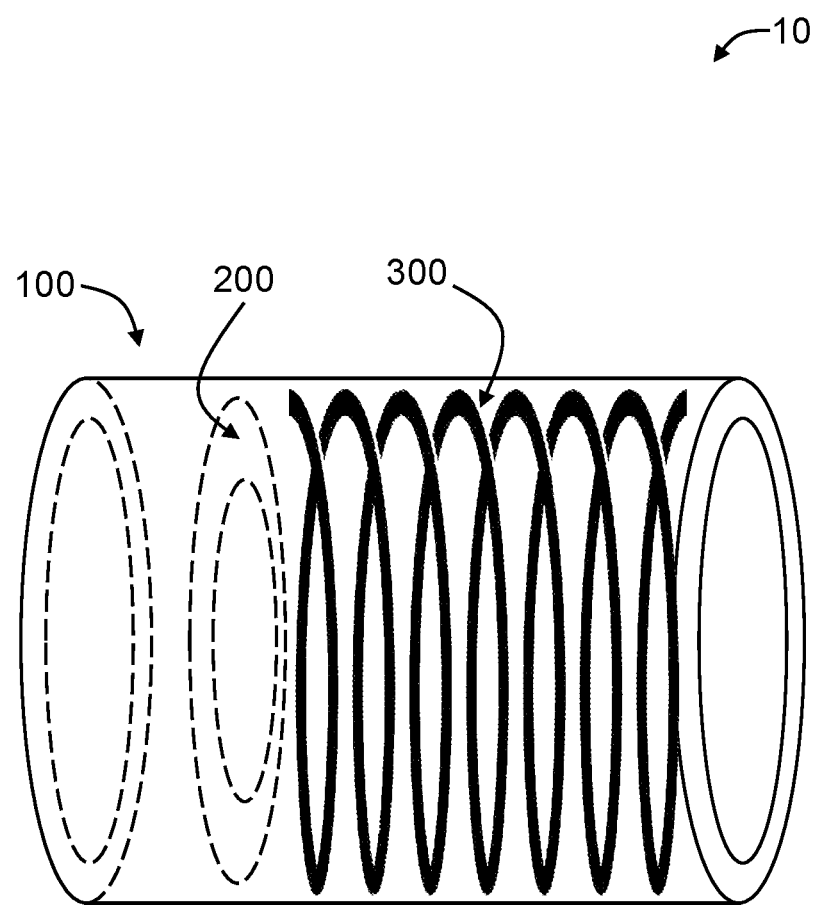
FIG. 1 shows a schematic of a charger plug release system according to exemplary embodiments hereof.

According to one aspect, one or more embodiments are provided below for a charging plug release system including a housing including an open first end, an open second end and an inner volume therebetween, a retaining collar located within the inner volume between the first end and the second end and including an aperture adapted to receive and releasably secure a charging plug, and a pre-loadable spring located between the retaining collar and the second end.

In another embodiment, the system includes a first stop configured with the first end and a second stop configured with the second end.

In another embodiment, the first stop and/or the second stop includes an inward circumferential lip.

In another embodiment, the first stop provides a stop to the retaining collar at the first end and the second stop provides a stop to the pre-loadable spring at the second end.

In another embodiment, the system may include a removable cap at the open first end, the removable cap including an aperture passing from outside the inner volume to inside the inner volume.

In another embodiment, the first stop is configured with the removable cap.

In another embodiment, the first stop includes an inward circumferential lip.

In another embodiment, the retaining collar includes an adapter member on a side facing the open first end, the adapter member configured to receive and releasably secure the charging plug.

In another embodiment, the adapter member includes first sidewalls that at least partially encircle the aperture, the first sidewalls extending outward from a surface on the retaining collar facing the open first end.

In another embodiment, the retaining collar includes a coupler on a side of the retaining collar facing the pre-loadable spring, the coupler configured to nest with the pre-loadable spring.

In another embodiment, the coupler includes second sidewalls that at least partially encircle the aperture, the second sidewalls extending outward and facing the pre-loadable spring, the coupler including a diameter that is smaller than an inner diameter of the pre-loadable spring.

In another embodiment, the open first end and the open second end define a longitudinal axis and the retaining collar is movable along the longitudinal axis.

In another embodiment, insertion of the charging plug into the aperture causes the retaining collar to move along the longitudinal axis towards the pre-loadable spring.

In another embodiment, the pre-loadable spring is compressible along the longitudinal axis.

In another embodiment, when the retaining collar is moved along the longitudinal axis towards the pre-loadable spring, the pre-loadable spring is caused to become compressed.

In another embodiment, when the pre-loadable spring is caused to become compressed, the pre-loadable spring applies a force to the retaining collar along the longitudinal axis in a direction towards the open first end.

In another embodiment, the force causes the retaining collar to move along the longitudinal axis towards the open first end.

In another embodiment, the open first end is adapted to receive the charging plug and the aperture is adapted to receive a portion of the charging plug.

In another embodiment, the aperture includes an aperture width that is larger than a first width of the charging plug at a front end of the charging plug, the aperture width being smaller than a second width of the charging plug at an intermediate portion of the charging plug.

In another embodiment, the pre-loadable includes a coiled spring.

The presently disclosed system and method for evaluating growing media is more fully described in the detailed description below.

DETAILED DESCRIPTION OF EXEMPLARY EMBODIMENTS

In general, and according to exemplary embodiments hereof, a charger plug release system is provided. In some embodiments, the charger plug release system is configured with an electric charging plug for use in charging an electric vehicle (EV). The charger plug release system provides a preloaded outward force to the electric charging plug when the plug is electrically connected to a charging receptacle on the EV. When charging is completed, the plug may be released (e.g., via a control application or mobile "app"), and the outward force applied by the system to the plug causes the plug to be ejected without manual intervention. Accordingly, the release system eliminates the need for the user to manually pull the plug from the EV charging receptacle, and instead, forcefully ejects the plug from the EV automatically. This allows the user to automatically remove the plug from the EV from within the vehicle or from another safe location.

In one exemplary embodiment hereof, as shown in FIG. 1, the charger release system 10 includes a housing assembly 100, a plug retaining collar 200, and a spring assembly 300. In general, the plug retaining collar 200 and the spring assembly 300 are contained within the housing assembly 100. An EV charging plug is inserted into the housing 100 and releasably secured to the plug retaining collar 200 therein. The spring assembly 300 is located between the retaining collar 200 and the front end of the housing 100 and is adapted to apply an outward force therebetween.

Figure 6:
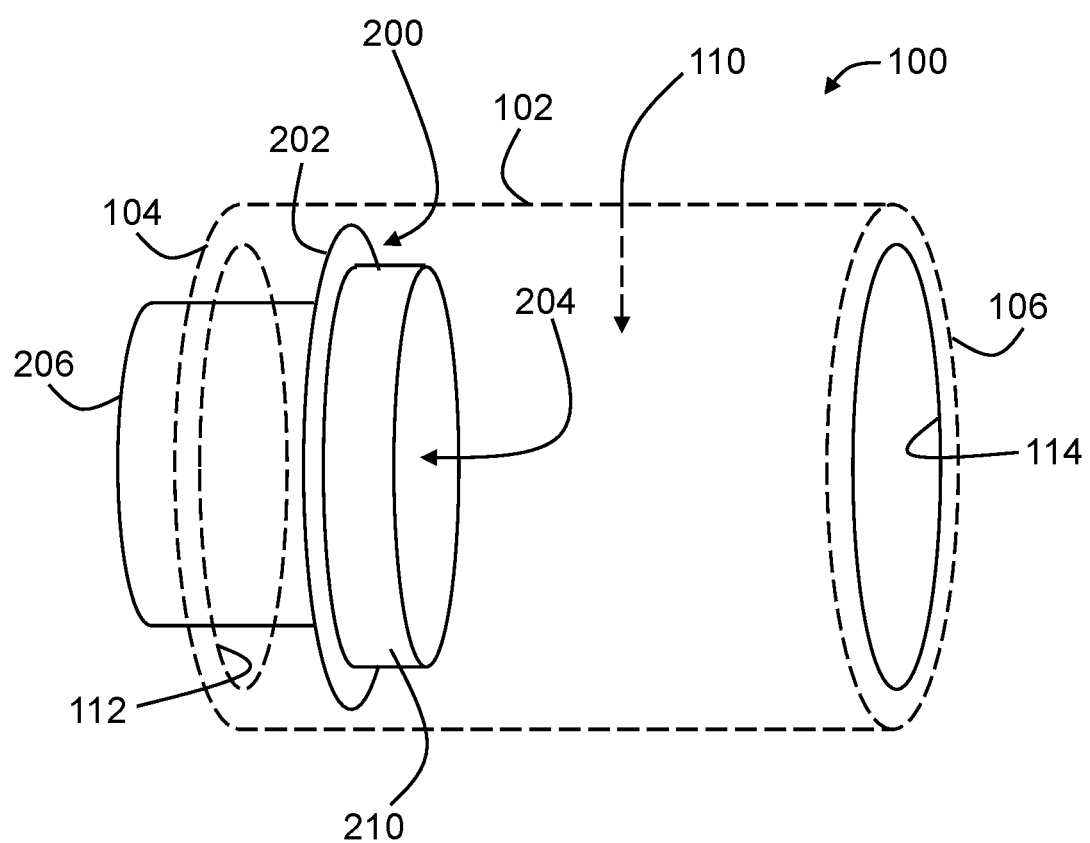
FIG. 6 shows a retaining collar within a housing of a charger plug release system according to exemplary embodiments hereof.

As a brief overview, to insert the plug P into a charging receptacle R on the EV via the system 10, as shown in FIG. 6, the plug P is moved forward within the housing 100 until the front end of the plug P is adequately exposed out the front end of the housing 100 and received into the charging receptacle R. This forward movement pre-loads the spring assembly 300 as the plug P mates with the receptacle R. The plug P is held secure within the receptacle R by a locking mechanism L located on the EV (and/or on the plug P) that may be unlocked electronically (e.g., using a mobile application, a dashboard control, etc.) for removal of the plug P. Upon unlocking the locking mechanism L, the preloaded spring assembly 300 exerts an outward force to the retaining collar 200 and the plug P attached thereto thereby ejecting plug P away from the EV. The charger release system 10 also may include other elements and/or components as necessary to perform its functionalities.

For the purposes of this written description, the system 10 will be described predominantly with respect to its use with electric vehicle charging plugs and corresponding receptacles. However, it is understood that the system 10 may be used with other types of plugs and corresponding receptacles, and that the scope of the system 10 is not limited in any way by the types of plugs and receptacles it is used with.

Housing Assembly 100

Figure 2A:
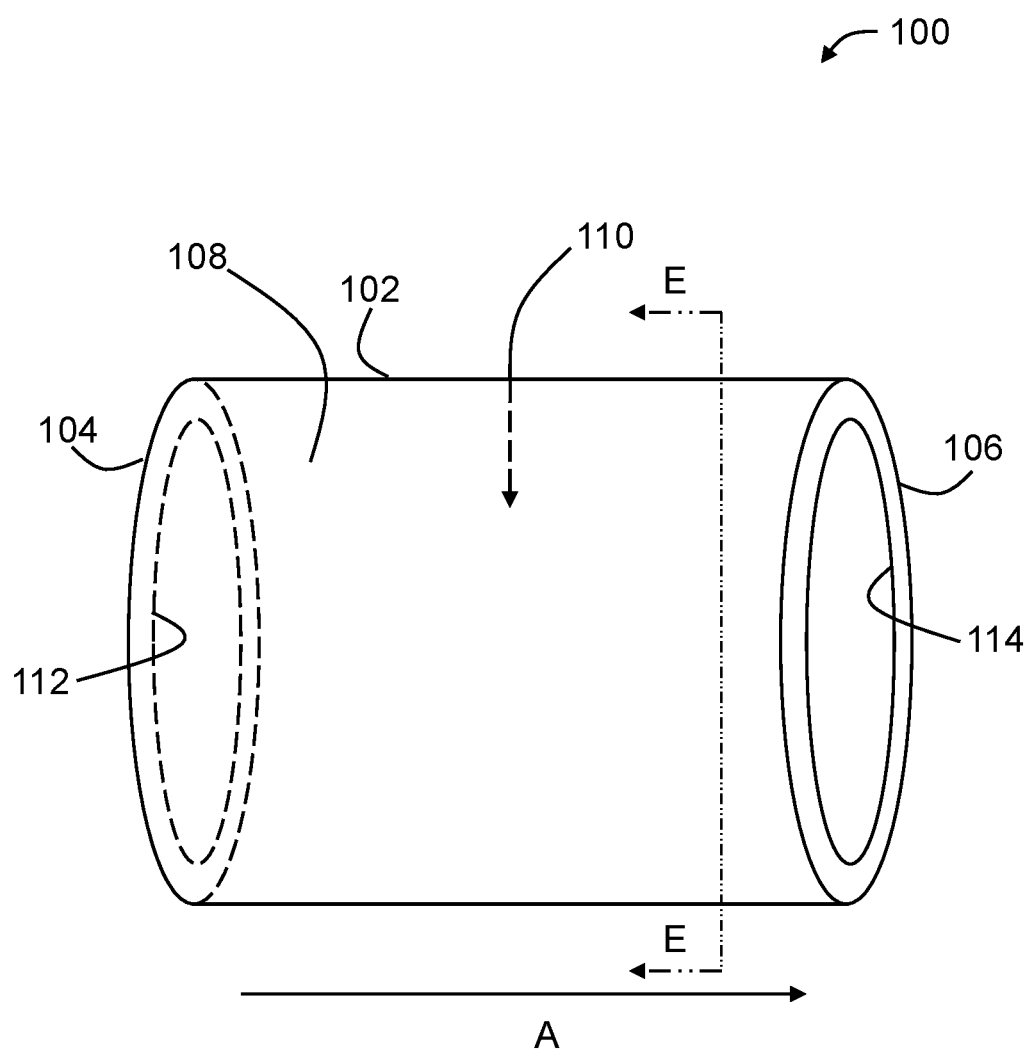
FIG. 2A shows a housing of a charger plug release system according to exemplary embodiments hereof.

In some embodiments as shown in FIG. 2A, the housing assembly 100 includes a housing body 102 with a first end 104 (e.g., a back end), a second end 106 (e.g., a front end), and sidewalls 108 extending between the first end 104 to the second end 106 defining an inner volume 110. The first end 104 and the second end 106 are both at least partially open and define a first longitudinal axis A. The housing body 102 may be formed as a tube, a truncated cone, a frustum, and/or as any other suitable hollow forms. In some embodiments, the sidewalls 108 may be solid or may include windows or side openings as necessary.

Figure 3A:
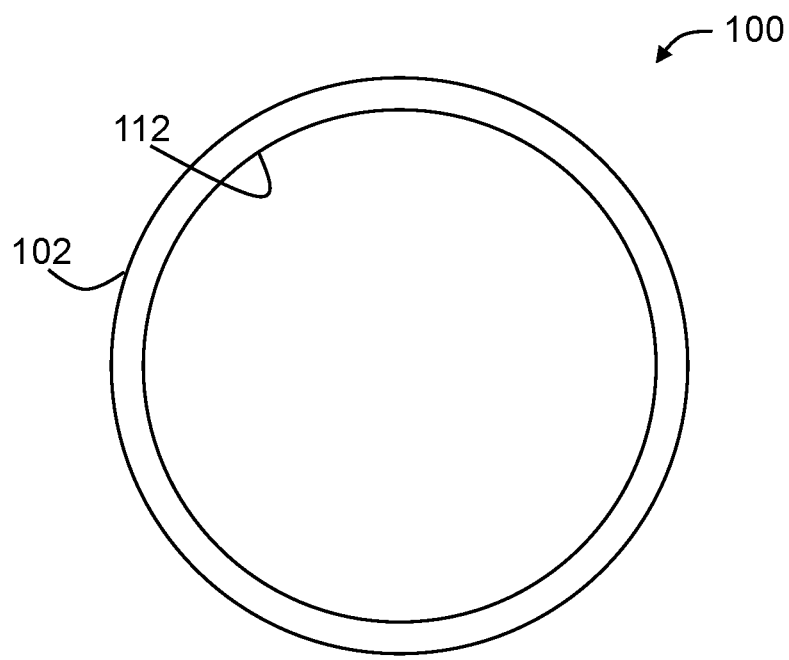
FIG. 3A shows a cross section of the housing of FIG. 2A according to exemplary embodiments hereof.
Figure 3B:
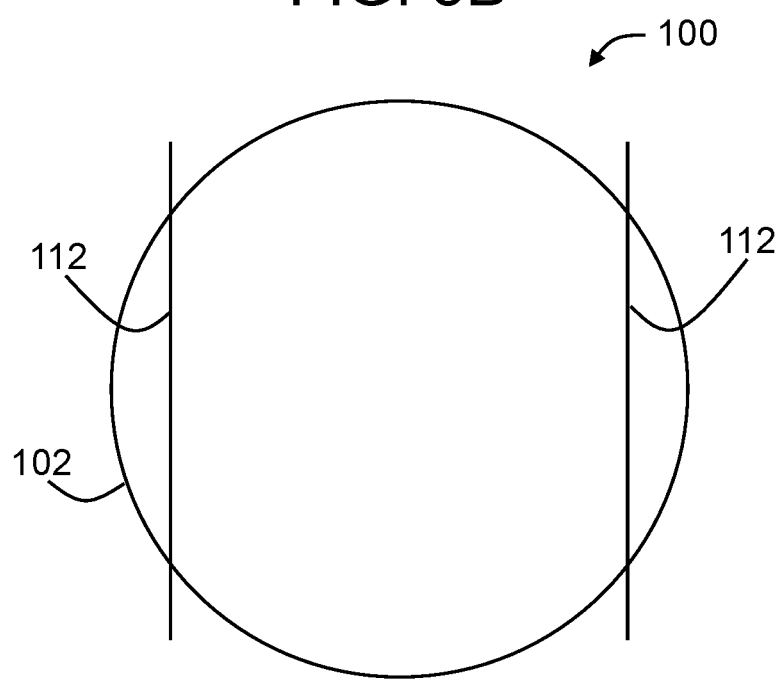
FIG. 3B shows a cross section of the housing of FIG. 2A according to exemplary embodiments hereof.

In some embodiments as shown in FIG. 2A, the first end 104 of the housing body 102 includes a first stop 112 that acts as a rear stop to the plug retaining collar 200 and/or the spring assembly 300 held within the housing 100. In addition, the second end 106 includes a second stop 114 that acts as a forward stop to the spring assembly 300 held within the housing 100. As will be described in other sections, the plug retaining collar 200 and the spring assembly 300 are located within the housing between the first and second stops 112, 114. FIGS. 3A-3B show cross sectional views of the housing body 102 and first stop 112 taken from the perspective of cutlines E-E of FIG. 2A, as described below.

The first stop 112 is designed to prevent the spring assembly 300 from passing from the inner volume 110 out through the first end 104 (e.g., out through the back end). In some embodiments, the first stop 112 may comprise an inner facing circumferential lip configured at least partially about the inner circumference of the first end 104 (see FIG. 3A), one or more retaining pins extending through the sidewalls 108 at the first end 104 and perpendicular to the longitudinal axis A (see FIG. 3B), other types of adequate stops, and any combinations thereof. In any event, the first stop 112 does not obstruct the insertion of an EV charging plug P through the first end 104 and into the inner volume 110 for use with the system 10.

Figure 2B:
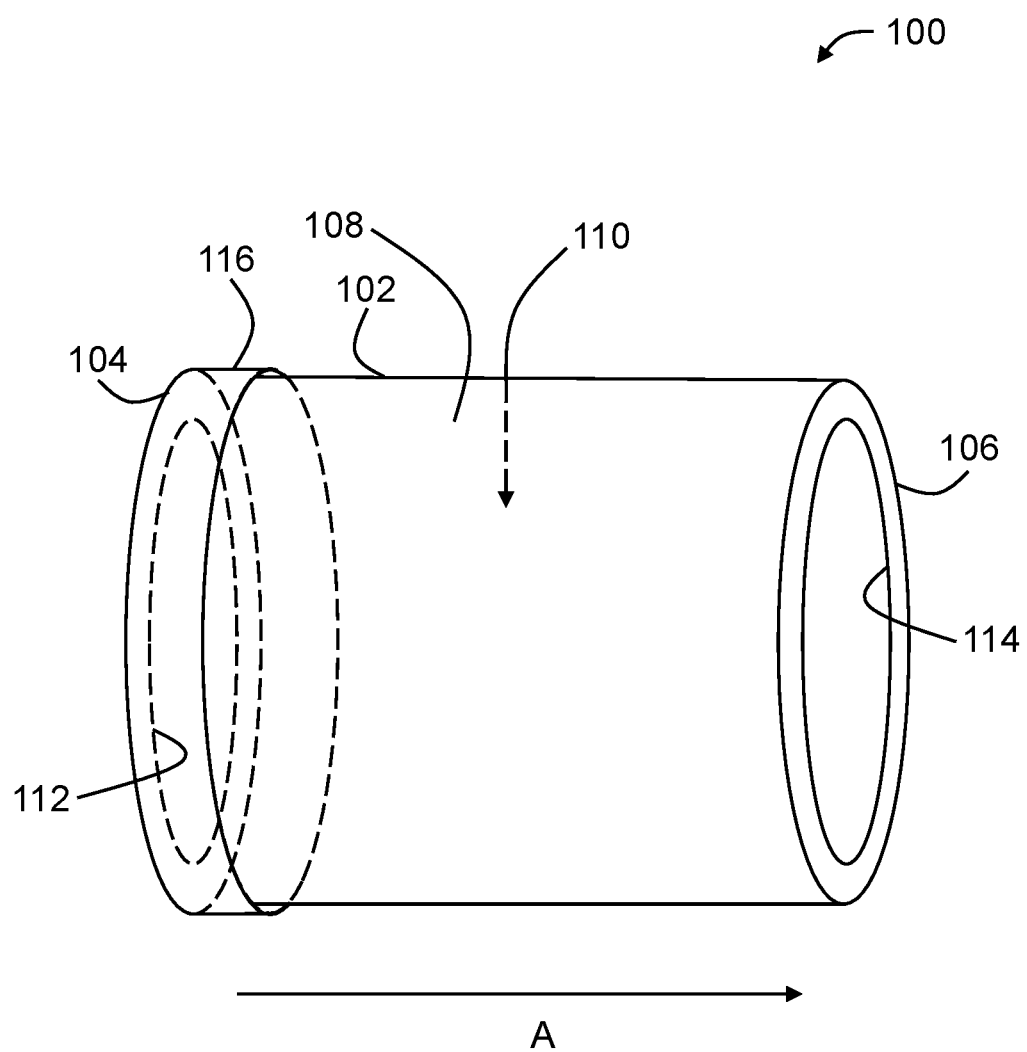
FIG. 2B shows a housing of a charger plug release system according to exemplary embodiments hereof.

In some embodiments, as shown in FIG. 2B, the housing assembly 100 includes a first end cap 116 that may be removably attached (e.g., using threads, detents, etc.) to the first end 104 of the housing body 102. In this case, the cap 116 may include a central opening with the first stop 112, e.g., with an inner circumferential lip 112. The cap 116 may be removed to provide access to the inner volume 110 and any elements of the system 10 contained therein. For example, as will be described in other sections, the cap 116 may be removed to replace the plug retaining collar 200 for use with a particular charging plug P.

The second stop 114 is designed to prevent the spring assembly 300 from passing from the inner volume 110 out through the second end 106 (e.g., out through the front end). In some embodiments, the second stop 114 may comprise an inner facing circumferential lip configured at least partially about the inner circumference of the second end 106 (see FIG. 3A), one or more retaining pins extending through the sidewalls 108 at the second end 106 and perpendicular to the longitudinal axis A (see FIG. 3B), and/or other types of adequate stops and any combinations thereof. In any event, the second stop 114 does not obstruct the extension of an EV charging plug P from inside the inner volume 110 out through the first end 104 to engage an EV charging receptacle R. In some embodiments, the second stop 114 may be configured as a front end cap with a central opening to allow for the outward extension of the charging plug P.

Plug Retaining Collar 200

Figure 4:
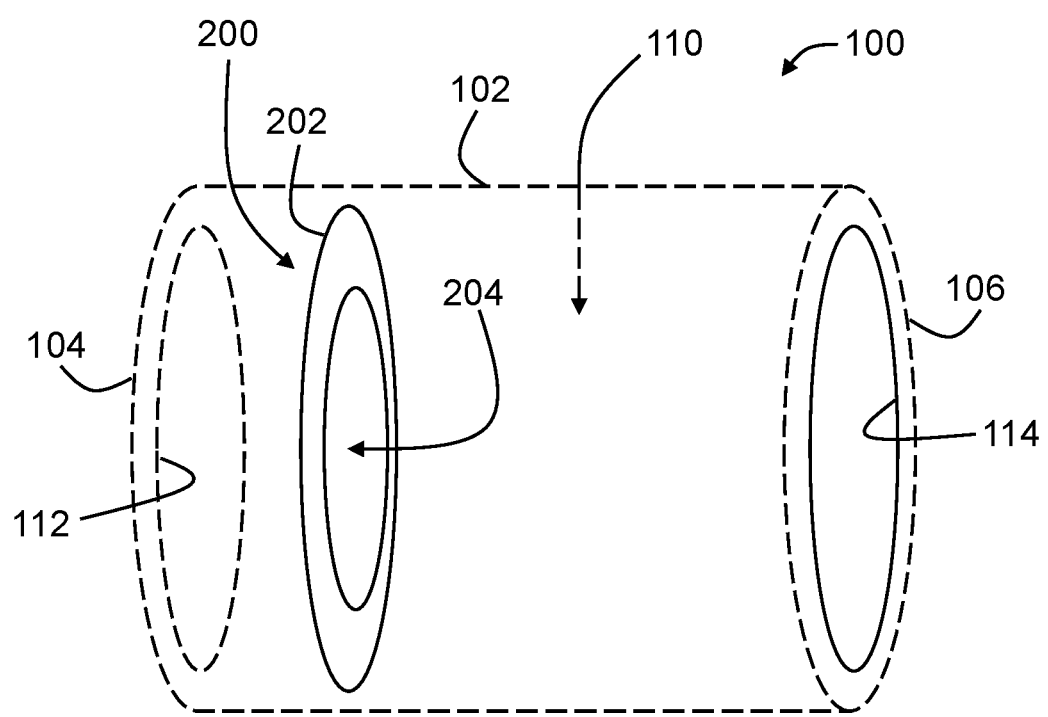
FIG. 4 shows a retaining collar within a housing of a charger plug release system according to exemplary embodiments hereof.

In some embodiments as shown in FIG. 4, the plug retaining collar 200 includes a body 202 with a central aperture 204. The body 202 may be in the form of a disk or other appropriate form with a diameter that is less than the inner diameter of the housing body 102 and greater than the opening at the housing body's 102's first end 104 formed by the first stop 112. In this way, the collar 200 may be positioned to move freely within the housing inner volume 110 while being prevented from passing through the housing first end 104 by the first stop 112.

As shown in FIG. 5, the retaining collar's 200's central aperture 204 passes through the collar body 202 and includes a shape designed to receive and removably attach to the body of a charging plug P. In some embodiments, the body of the charging plug P is held within the aperture 204 by pressure fit. To this end, the aperture 204 may be formed to generally match a cross-sectional shape of the plug P at an intermediary location on the plug P. In this way, the aperture 204 may receive the front end of the plug P and may become lodged with the intermediary portion of the plug P to hold the plug P thereby. In addition, the aperture 204 may include a circumferential gasket or other type of padding that may accommodate the cross-sectional shape of the charging plug P. It also is contemplated that the charging plug P may be held in place within the aperture 204 by other attachment mechanisms such as, without limitation, latches, detents, notches, other releasable attachment mechanisms, and any combinations thereof.

Figure 5A:
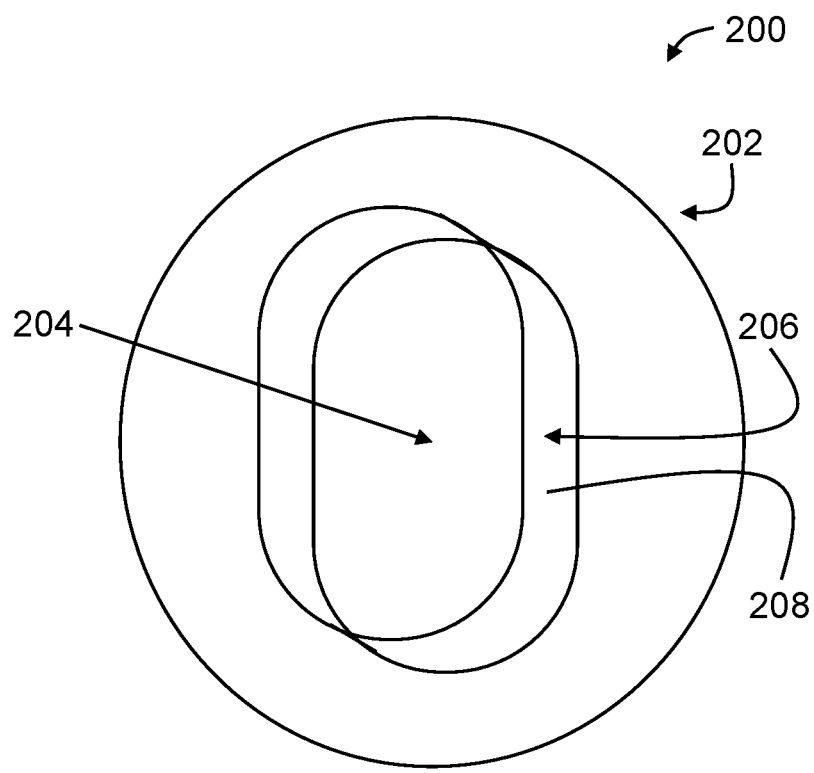
FIG. 5A shows a retaining collar of a charger plug release system according to exemplary embodiments hereof.
Figure 5B:
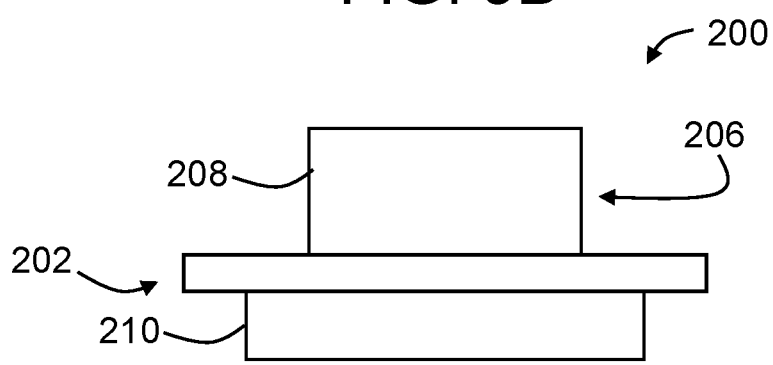
FIG. 5B shows a retaining collar of a charger plug release system according to exemplary embodiments hereof.

In some embodiments, as shown in FIGS. 5A-5B, the plug retaining collar's 200's body 202 includes an adapter member 206 that generally encircles the aperture 204 and includes sidewalls 208 that extend outward from the body 202 therefrom. FIG. 5A is a schematic of the collar 200 with adapter member 206, and FIG. 5B is a side view of the same. The adapter member 206 is designed to generally match the cross-sectional shape of the charging plug P at the intermediary location to enable the plug retaining collar 200 to better receive and secure the charging plug P as described above. For example, the cross-sectional shape of the adapter member 206 may be custom fit for a particular charger plug P. In addition, the adapter member's 206's sidewalls 208 may provide additional lateral support to the charging plug P when the plug P is held within the collar 200. In some embodiments, the first end cap 116 of the housing assembly 100 may be removed so that a particular plug retaining collar 200 and its particular adapter member 206 may be inserted into the system 10 for use with a particular charging plug P.

In some embodiments, as shown in FIG. 6, when the retaining collar 200 is configured within the inner volume 110 of the housing 100, a portion of the adapter member 206 may extend outward through the housing's 100's first end 104. This may facilitate the placement and mating of the charging plug P within the retaining collar 200 during use.

In some embodiments, as shown in FIG. 5B, the plug retaining collar's 200's body 202 includes a spring assembly coupler 210 opposite the adapter member 206. The spring assembly coupler 210 may include sidewalls extending outward from the plug retaining collar's 200's body 202 and at least partially encircling the aperture 204. The spring assembly coupler 210 preferable includes a diameter that may fit within an end of the spring assembly 300 such that the spring assembly 300 may be nested with the collar 200 via the coupler 210. This may help hold the spring assembly 300 in place with the plug retaining collar 200 within the housing 100 during use.

Spring Assembly 300

Figure 7:
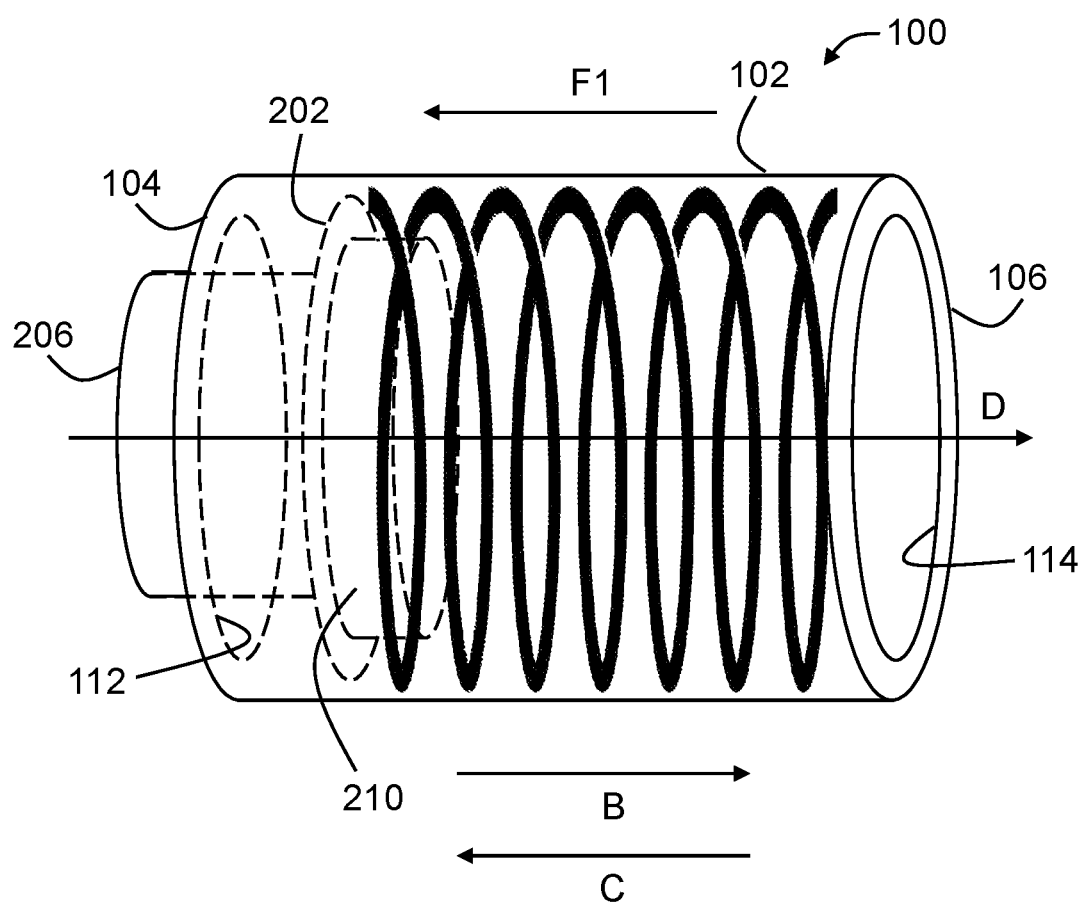
FIG. 7 shows a spring assembly within a housing of a charger plug release system according to exemplary embodiments hereof.

In some embodiments as shown in FIG. 7, the spring assembly 300 includes a coiled spring 302 located within the housing 100 abutted between the retaining collar 300 and the second stop 114. The coiled spring 302 is preferably concentrically aligned within the inner volume 110 so that the open longitudinal portion of the spring 302 is generally aligned with the central longitudinal axis D passing through the housing 100 from its first end 104 to its second end 106. As described above, the spring assembly coupler 210 on the plug retaining collar 200 may provide this alignment. In this way, the plug P may be inserted into the housing 100 and may pass through the coiled spring 302 as described in other sections.

The coiled spring 302 is able to be compressed (preloaded) in a first direction B causing it to exert a force F1 in a second direction C opposite the first direction B. In the configuration described above and depicted in FIG. 5, the spring 302 may be preloaded by moving the retaining collar 200 forward in the direction of the arrow B. When the spring 302 is subsequently released, the spring 302 expands in the second direction C (e.g., back to its original form) while exerting a force F1 in the second direction C to the retaining collar 200 (and to the plug P secured thereto). As will be described in other sections, this force F1 causes the plug P to eject from the charging receptacle R on the EV without manual intervention.

It is understood that while the spring assembly 300 has been described as a coiled spring 302, it is understood that the spring assembly 300 may comprise any type of spring-loadable mechanism that may perform the same or similar functionalities described, and that the scope of the spring assembly 300 is not limited in any way by the type of spring mechanism(s) that it may include. It also is understood that the spring assembly 300 may include multiple spring mechanisms, as necessary.

In Use

Figure 8:
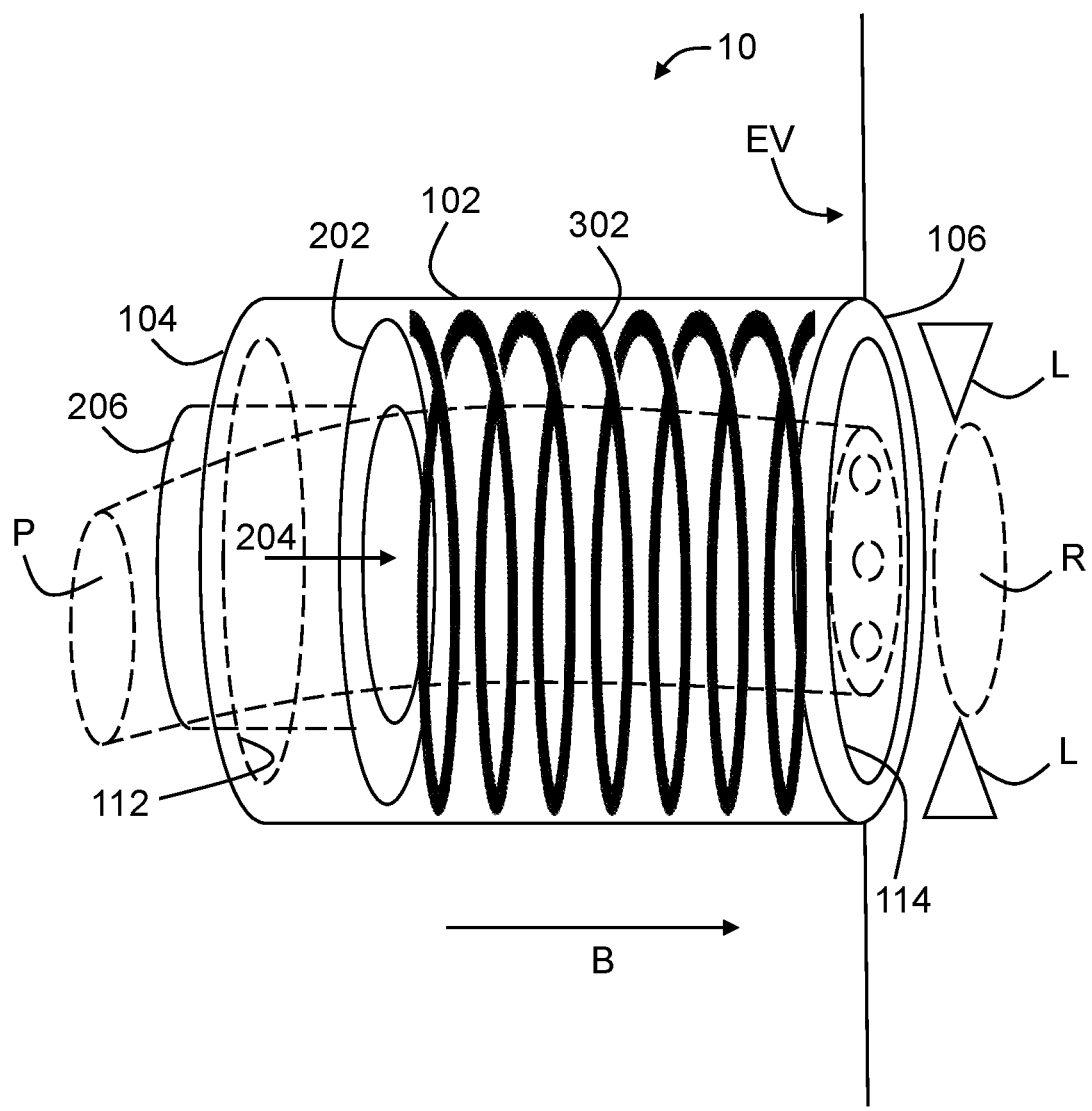
FIG. 8 shows a charging plug configured with a charger plug release system according to exemplary embodiments hereof.

As shown in FIG. 8, the charging plug P may be inserted into the first end 104 of the housing body 102 and be received by the plug retaining collar 200. A forward portion of the plug P may pass through the collar's 200's adapter member 206 and aperture 204, and an intermediary portion of the plug P may become lodged in the adapter member 206 and/or the aperture 204 and releasably held thereby. It may be preferable that this results in the front of the plug P being positioned towards (or at) the second end 106 of the housing body 102, and preferably not past the housing's 100's second end 106 (see FIG. 8). The spring assembly coupler 210 has been omitted in FIGS. 8-9 for clarity, however, it is understood that the coupler 210 may be utilized in the arrangements shown.

Figure 9:
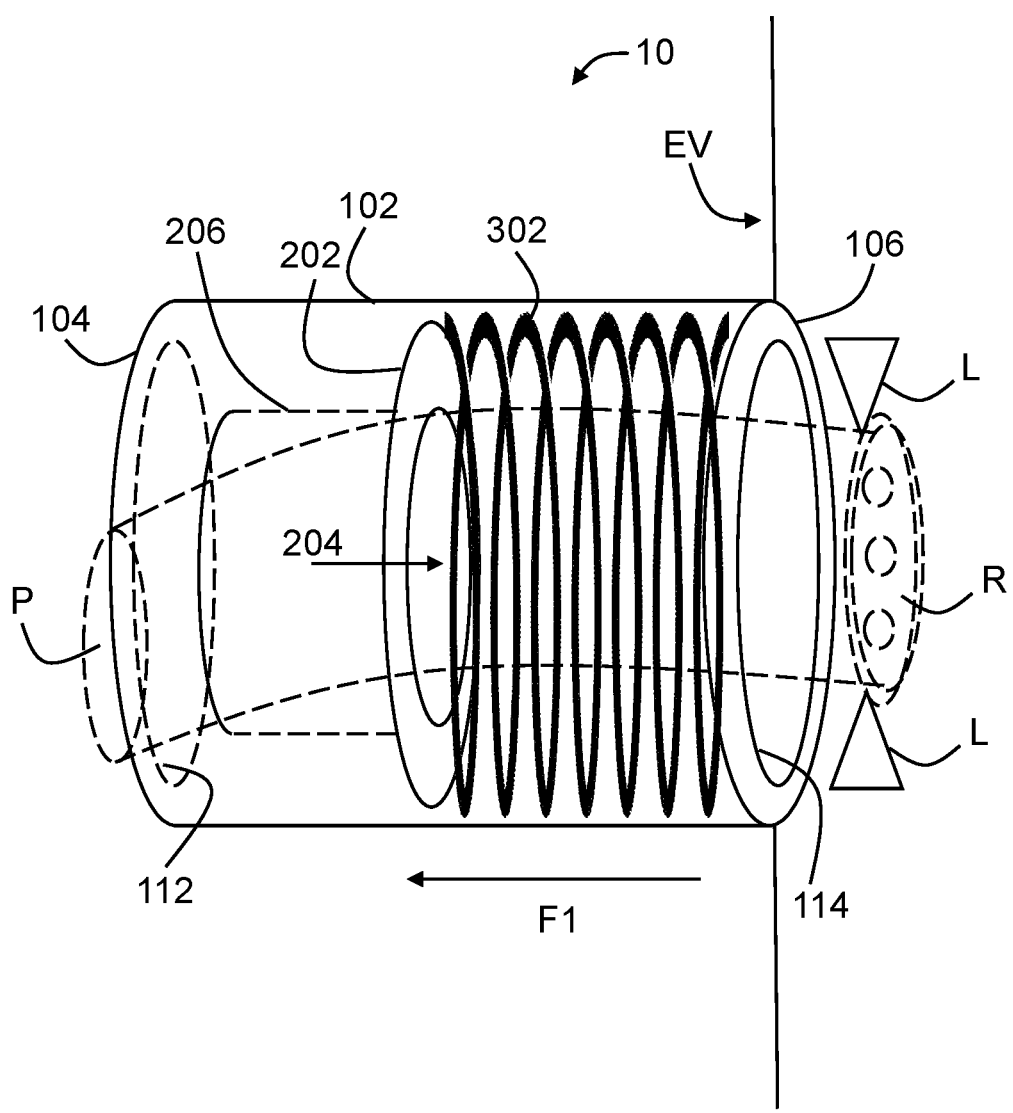
FIG. 9 shows a charging plug configured with a charger plug release system according to exemplary embodiments hereof.

Next, the front of the plug P may be aligned with the EV's charging receptacle R as shown in FIG. 8. The plug P and the retaining collar 200 may then be moved forward in the housing 100 in the direction of the arrow B such that the front end of the plug P extends out of the housing's 100's second end 106 as shown in FIG. 9. In this arrangement, the charging plug P may physically and electrically engage with the charging receptacle R (to charge the EV) and be locked in place by the locking mechanisms L. Notably, the locking mechanisms L are preferably provided as part of the charging receptacle R, the plug P, and/or by any other element of the EV. However, it also is contemplated that the locking mechanisms L may be integrated with the system 10. The locking mechanisms L may include any type of adequate locking mechanisms and are remotely released by a remote controller, such as, without limitation, a mobile application, a control within the EV (e.g., on the dashboard), or by any other type of suitable remote controller. In this way, the plug P may be inserted into the receptable R and locked in place, and subsequently remotely released, e.g., when charging is complete as described below.

As shown in FIG. 9, the forward movement of the plug P and of the retaining collar 200 causes the spring assembly 300 to be compacted (preloaded) between the retaining collar 200 and the housing's 100 second stop 114 at the second end 106 of the housing body 102. In addition, the locking of the plug P within the receptacle R holds the spring 202 in this compacted state against the EV. The spring 302 remains in this position as the EV is being charged by the plug P with the plug P and the receptacle R electrically mated.

When charging is complete, or when the user otherwise desires to release the plug P from the receptacle R automatically and without manual intervention, the user remotely releases the locking mechanisms L (e.g., by using the mobile application). Once unlocked, the plug P and the retaining collar 200 are free to move, and the force F1 applied to the retaining collar 200 by the spring 202 ejects the plug P and the overall system 10 from the EV. In this way, the user is able to remove the charging plug P from the EV remotely and safely from within the EV or other safe area.

It is understood that any aspect and/or element of any embodiment of the system 10 described herein or otherwise may be combined in any way with any other aspect and/or element of any other embodiment to form additional embodiments of the system 10 all of which are within the scope of the system 10.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. A charging plug release system for use with a charging plug, the charging plug release system comprising;
    a retaining collar including an aperture and adapted to receive the charging plug, the charging plug including a plug first end, a plug second end opposite the plug first end, and a plug body extending between the plug first end and the plug second end, the plug first end including an electrical terminal adapted to be electrically connected to a charging connector on an electric vehicle, the retaining collar adapted to receive the plug first end through the aperture, the aperture adapted to be releasably attached to the plug body at a collar attachment location on the plug body between the plug first end and the plug second end when the plug first end is received through the aperture; and
    a pre-loadable spring configured to apply a force to the retaining collar at the collar attachment location and towards the plug second end when the plug first end is received through the aperture and the electrical terminal is electrically connected to the charging connector on the electric vehicle;
    wherein the force causes the electrical terminal to electrically disconnect from the charging connector on the electric vehicle.

2. The charging plug release system of claim 1 further comprising:
    a first stop configured with the first end and a second stop configured with the second end;
    wherein the first stop provides a stop to the retaining collar at the first end and the second stop provides a stop to the pre-loadable spring at the second end.

3. The charging plug release system of claim 2 wherein the first stop and/or the second stop includes an inward circumferential lip.

4. The charging plug release system of claim 1 further comprising a removable cap at the open first end, the removable cap including a cap aperture passing from outside the inner volume to inside the inner volume.

5. The charging plug release system of claim 2 further comprising a removable cap at the open first end, and the first stop is configured with the removable cap.

6. The charging plug release system of claim 5 wherein the first stop includes an inward circumferential lip.

7. The charging plug release system of claim 1 wherein the retaining collar includes an adapter member on a side facing the open first end, the adapter member configured to receive and releasably secure the charging plug.

8. The charging plug release system of claim 7 wherein the adapter member includes first sidewalls that at least partially encircle the aperture, the first sidewalls extending outward from a surface on the retaining collar facing the open first end.

9. The charging plug release system of claim 1 wherein the retaining collar includes a coupler on a side of the retaining collar facing the pre-loadable spring, the coupler configured to nest with the pre-loadable spring.

10. The charging plug release system of claim 9 wherein the coupler includes second sidewalls that at least partially encircle the aperture, the second sidewalls extending outward and facing the pre-loadable spring, the coupler including a diameter that is smaller than an inner diameter of the pre-loadable spring.

11. The charging plug release system of claim 1 wherein the open first end and the open second end define a longitudinal axis and the retaining collar is movable along the longitudinal axis.

12. The charging plug release system of claim 11 wherein insertion of the charging plug into the aperture causes the retaining collar to move along the longitudinal axis towards the pre-loadable spring.

13. The charging plug release system of claim 11 wherein the pre-loadable spring is compressible along the longitudinal axis.

14. The charging plug release system of claim 11 wherein when the retaining collar is moved along the longitudinal axis towards the pre-loadable spring, the pre-loadable spring is caused to become compressed.

15. The charging plug release system of claim 14 wherein when the pre-loadable spring is caused to become compressed, the pre-loadable spring applies a force to the retaining collar along the longitudinal axis in a direction towards the open first end.

16. The charging plug release system of claim 15 wherein the force causes the retaining collar to move along the longitudinal axis towards the open first end.

17. The charging plug release system of claim 1 wherein the open first end is adapted to receive the charging plug and the aperture is adapted to receive a portion of the charging plug.

18. The charging plug release system of claim 1 wherein the aperture includes an aperture width that is larger than a first width of the charging plug at a front end of the charging plug, the aperture width being smaller than a second width of the charging plug at an intermediate portion of the charging plug.

19. The charging plug release system of claim 1 wherein the pre-loadable includes a coiled spring.

20. A charging plug release system comprising:
    a housing including an open first end, an open second end and an inner volume therebetween;
    a retaining collar located within the inner volume between the first end and the second end and including an aperture adapted to receive and releasably secure a charging plug; and
    a pre-loadable spring located between the retaining collar and the second end;
    wherein the retaining collar includes a coupler on a side of the retaining collar facing the pre-loadable spring, the coupler configured to nest with the pre-loadable spring; and
    wherein the coupler includes second sidewalls that at least partially encircle the aperture, the second sidewalls extending outward and facing the pre-loadable spring, the coupler including a diameter that is smaller than an inner diameter of the pre-loadable spring.

* * * * *